(No Model.) 3 Sheets—Sheet 1.
C. S. SHARP.
HORSE RAKE.
No. 587,761. Patented Aug. 10, 1897.

Witnesses:
Harry O. Robinson.
F. H. Davis.

Inventor:
Charles S. Sharp
by B. J. Hayes
Attorney.

(No Model.) 3 Sheets—Sheet 3.
C. S. SHARP.
HORSE RAKE.
No. 587,761. Patented Aug. 10, 1897.

Witnesses:
Harry O. Robinson.
F. H. Davis.

Inventor:
Charles S. Sharp
by B. J. Noyes
Atty.

UNITED STATES PATENT OFFICE.

CHARLES S. SHARP, OF AUBURN, NEW YORK, ASSIGNOR TO THE D. M. OSBORNE & COMPANY, OF SAME PLACE.

HORSE-RAKE.

SPECIFICATION forming part of Letters Patent No. 587,761, dated August 10, 1897.

Application filed May 16, 1896. Serial No. 591,786. (No model.)

*To all whom it may concern:*

Be it known that I, CHARLES S. SHARP, of Auburn, county of Cayuga, State of New York, have invented an Improvement in Horse-Rakes, of which the following description, in connection with the accompanying drawings, is a specification, like letters on the drawings representing like parts.

This invention relates to horse-rakes, and has for its object to provide the same with improved means for preventing the hay from rolling in the hay-receiving space formed by the curved teeth of the rake as said hay accumulates therein; and the invention consists in the combination, with any usual or suitable rake-teeth and stripper bars or fingers or equivalent clearing devices for said rake-teeth, of check-teeth for the hay which accumulates in the hay-receiving space of the rake-teeth, which operate to prevent or check the hay from rolling in said hay-receiving space, said check-teeth being made independent of the usual stripper bars or fingers and preferably loosely or flexibly supported at their forward ends in order that they may move freely and independently a limited distance.

Means are preferably provided for adjusting said check-teeth in such manner as to hold them with their points at different elevations above the ground.

Figure 1:
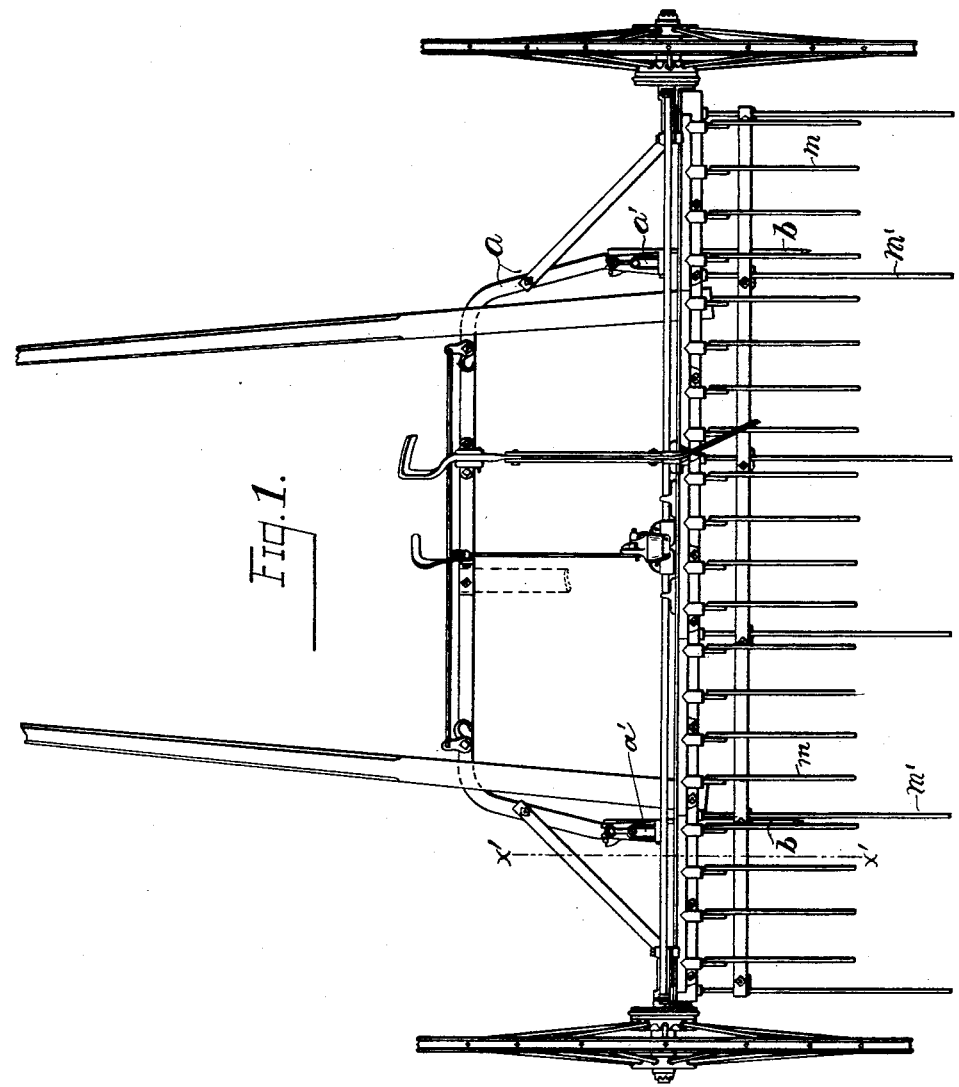
Figure 2:
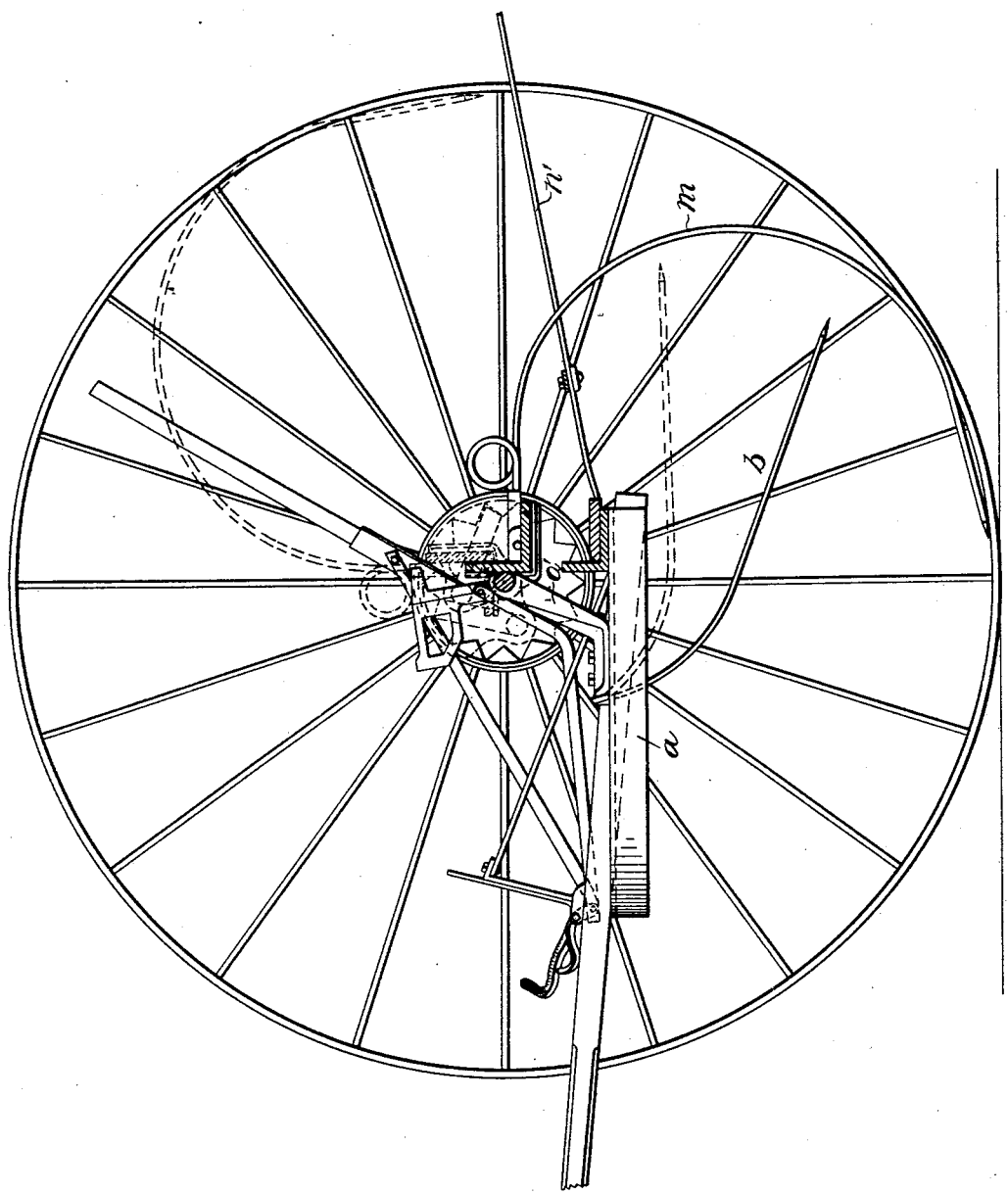
Figure 3:
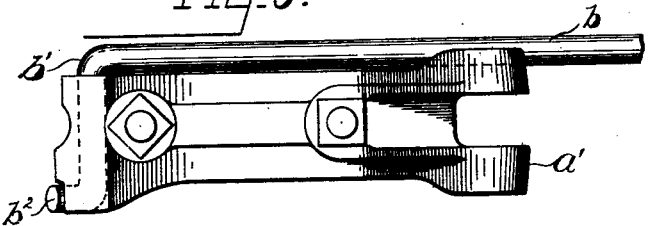
Figure 4:
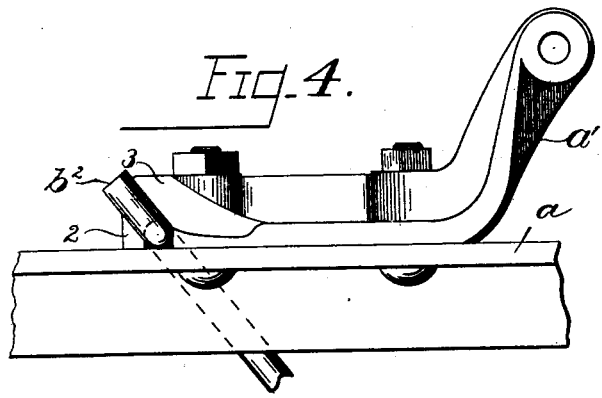
Figure 5:
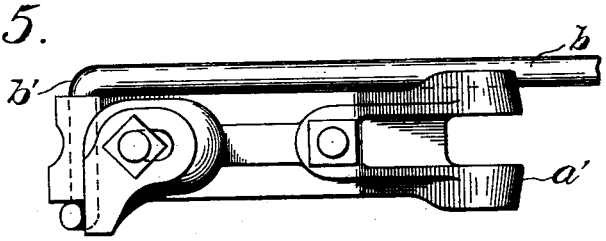
Figure 6:
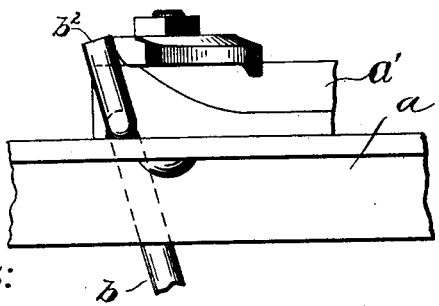

Figure 1 shows in plan view a horse-rake provided with check-teeth embodying this invention; Fig. 2, a vertical section of the rake shown in Fig. 1, taken on the dotted line $x'$ $x'$; Figs. 3 and 4, plan and side views, respectively, of the support for the check-teeth shown in Fig. 3; Figs. 5 and 6, similar plan and side views showing a support for the check-teeth having an adjusting device, whereby their points are held at different elevations above the ground.

The horse-rake herein shown and to which my present invention is applied is of substantially the same construction as represented in United States Patent No. 517,491, dated April 3, 1894, to which reference may be had, yet any other well-known or suitable form might be shown.

The rake-teeth $m$, of which there may be as many as desired and which may be of any usual or suitable construction, are secured to a rolling rake-head, and the stripper bars or fingers $m'$, which are secured to the frame of the rake and project rearwardly between said rake-teeth $m$, may also be of any usual or suitable construction so long as they serve as clearing devices for the rake-teeth.

The draft-frame $a$ has brackets $a'$ erected thereon, formed with bifurcated ends, which receive ears on the rolling rake-head, and pivot-bolts are provided, which pass through said bifurcated ends and the said ears, and thereby pivotally connect the rolling rake-head to the draft-frame.

The check-teeth $b$ for the hay which accumulates in the hay-receiving space in the rake-teeth $m$, of which there may be several and which herein form the essential feature of novelty, are composed of rods like unto the rake-teeth, and they are supported at their forward ends and project rearwardly into the hay-receiving space of the rake-teeth, terminating, however, a short distance in front of said rake-teeth, so as to leave an unobstructed passage for the hay.

The check-teeth $b$ are herein shown as made straight for the most part and provided with more or less pointed rear ends, and at their forward ends they have pivotal portions $b'$, which may be formed by bending the forward ends of the rods at right angles to the main part thereof, and said right-angular pivotal portions $b'$ occupy and turn freely in transverse recesses formed in the brackets $a'$, which are secured to the draft-frame $a$. In this instance the transverse recesses are formed at the forward ends of said brackets, and said recessed ends are cut away at one side to form a working passage or space 2 and a shoulder 3, and the ends of the pivotal portions $b'$ of the check-teeth are bent or caused to project at right angles a short distance, as at $b^2$, presenting short upturned ends which work in said passages or spaces 2 and which strike upon or against the shoulders 3 to limit the movement of the check-teeth in one direction. The movement of said check-teeth is limited in the opposite direction by said upturned ends striking upon or against the top of the draft-frame $a$ or other fixed point.

The check-teeth $b$ normally occupy a position oblique to the ground, as shown by full lines, Fig. 2, but are free to rise independently into the dotted-line position shown in said figure when required—as, for instance, when lifting the rake-teeth to dump.

While the rake is accumulating the hay the rake-teeth and check-teeth are in the position shown by full lines, Fig. 2, and the hay which is gathered by the rake-teeth will be caught by and thrust upon said oblique check-teeth, although some of the hay will pass by the rear ends of said check-teeth, and said check-teeth thus spearing the hay will prevent it from rolling over in the hay-receiving space of the rake-teeth.

When dumping the accumulated hay, the rake-teeth are elevated as usual, and the check-teeth $b$ will rise somewhat, owing to their loose connection with the frame by reason of being entangled with the hay, and the hay is then free to be discharged, the check-teeth being withdrawn from the hay as the rake advances.

As soon as the upward strain on the check-teeth is relieved they will fall and resume their normal oblique position.

The shoulder 3 may be formed integral with the bracket $a'$, as shown in Figs. 3 and 4, or it may be made as a separate plate, as shown in Figs. 5 and 6, and when made separate it may be adjustably connected with the bracket $a'$ by means of a bolt passing through a slot in the plate, and such adjustment permits the points of the check-teeth to occupy different elevations above the ground. In this case the plate and its connections serve as an adjusting device for the check-teeth.

I claim—

1. In a rake, rake-teeth, means for operating them, and stripper bars or fingers, combined with check-teeth for the accumulating hay, which project rearwardly into the hay-receiving space of said rake-teeth, and terminate in front of said teeth, substantially as described.

2. In a rake, rake-teeth, means for lifting them, and stripper bars or fingers, combined with check-teeth for the accumulating hay, which project rearwardly into the hay-receiving space of the rake-teeth obliquely to the ground, and terminate in front of said teeth, presenting points upon which the hay is thrust, substantially as described.

3. In a rake, rake-teeth, means for lifting them and stripper bars or fingers combined with independently-movable check-teeth for the accumulating hay, which project rearwardly into the hay-receiving recess of the rake-teeth, and terminate in front of said teeth, substantially as described.

4. In a rake, rake-teeth, means for lifting them, and stripper bars or fingers, combined with check-teeth for the accumulating hay, which project rearwardly into the hay-receiving space of the rake-teeth, and terminate in front of said rake-teeth, each loosely supported at its forward end and movable independently from a position oblique to the ground to a position substantially parallel therewith, substantially as described.

5. In a rake, rake-teeth, means for operating them, and stripper bars or fingers, combined with check-teeth for the accumulating hay, which project rearwardly into the hay-receiving space of said rake-teeth, and terminate in front of said teeth, and means for adjusting said check-teeth with their points at different elevations above the ground, substantially as described.

6. In a rake, rake-teeth, means for lifting them and stripper bars or fingers combined with independently-movable check-teeth for the accumulating hay, which project rearwardly into the hay-receiving recess of the rake-teeth, and terminate in front of said teeth, and independent means for adjusting each check-tooth with its point at a different elevation above the ground, substantially as described.

7. In a horse-rake, a draft-frame having brackets erected thereon, formed to present supports for a rolling rake-head, transverse recesses formed in said brackets, and check-teeth $b$ for the accumulating hay having pivot portions contained in said recesses, substantially as described.

8. In a horse-rake, a draft-frame having brackets erected thereon, formed to present supports for a rolling rake-head, transverse recesses formed in said brackets, and working spaces 2 adjacent thereto and shoulders 3, and check-teeth $b$ for the accumulating hay having pivot portions $b'$ contained in said transverse recesses, and also having projections $b^2$ working in said spaces 2 and adapted to bear against the shoulders 3 so as to limit the movement of said check-teeth in one direction, substantially as described.

9. In a horse-rake, the check-teeth $b$ for the accumulating hay, and supports by which they are loosely held, each consisting of a block formed with a transverse recess for the pivot portion of the tooth, and an adjustable plate located adjacent to and projecting beyond one end of said recess against which a projecting end portion of the tooth bears to limit the movement of said tooth in one direction, substantially as described.

In testimony whereof I have signed my name to this specification in the presence of two subscribing witnesses.

CHARLES S. SHARP.

Witnesses:
SIDNEY E. FARWELL,
W. C. JIRDINSTON.